United States Patent [19]

Smith

[11] Patent Number: 4,719,544
[45] Date of Patent: Jan. 12, 1988

[54] ELECTRONIC JEWELRY

[76] Inventor: Robert M. Smith, 28 Talcott Forest Rd., Farmington, Conn. 06032

[21] Appl. No.: 893,696

[22] Filed: Aug. 6, 1986

[51] Int. Cl.⁴ .......................... F21S 1/00; F21L 15/08; A44C 7/00; F21V 8/00
[52] U.S. Cl. ...................... 362/104; 362/32; 362/800; 63/13
[58] Field of Search ................. 362/32, 103, 104, 800; 63/2, 12, 13

[56] References Cited

U.S. PATENT DOCUMENTS

| | | | |
|---|---|---|---|
| 3,675,005 | 7/1972 | Curiel | 362/32 |
| 3,758,771 | 9/1973 | Frohardt et al. | 362/32 |
| 3,814,926 | 6/1974 | Frasca | 63/13 X |
| 4,009,382 | 2/1977 | Schreiber | 362/104 X |
| 4,097,917 | 6/1978 | McCaslin | 362/800 X |
| 4,186,425 | 1/1980 | Nadimi | 362/32 |
| 4,271,457 | 6/1981 | Martin | 63/13 X |
| 4,296,459 | 10/1981 | DeLuca | 362/104 |
| 4,337,504 | 6/1982 | Simpson | 362/104 |
| 4,459,645 | 7/1984 | Glatter | 362/104 |
| 4,605,882 | 8/1986 | DeLuca | 362/104 |

FOREIGN PATENT DOCUMENTS 2347607 11/1977 France ........................ 362/104

Primary Examiner—Albert W. Davis, Jr.
Attorney, Agent, or Firm—Fishman & Dionne

[57] ABSTRACT

Ornamental electronic jewelry preferably in the form of an earring is presented which is comprised of a housing with a plurality of fiber-optic strands extending therefrom. The housing includes therein a self-contained battery and light emitting diode (LED). The bundle of fiber-optic strands are directly attached to the LED via an opening in the LED housing. The batteries are electrically connected to the LED so that the LED transfers light to the bundle of fiber-optic strands. Preferably, an earring closure mechanism is provided which acts to both attach the earring to an ear as well as to provide on/off switching. In an alternative embodiment, an electronic circuit is encased in the housing to provide flashing to the LED and hence the fiber-optic strands.

10 Claims, 7 Drawing Figures

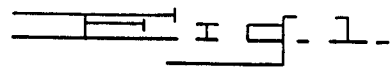
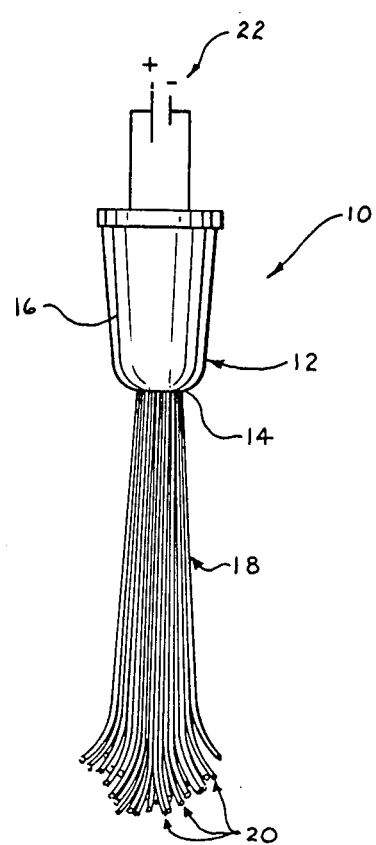
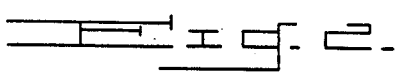
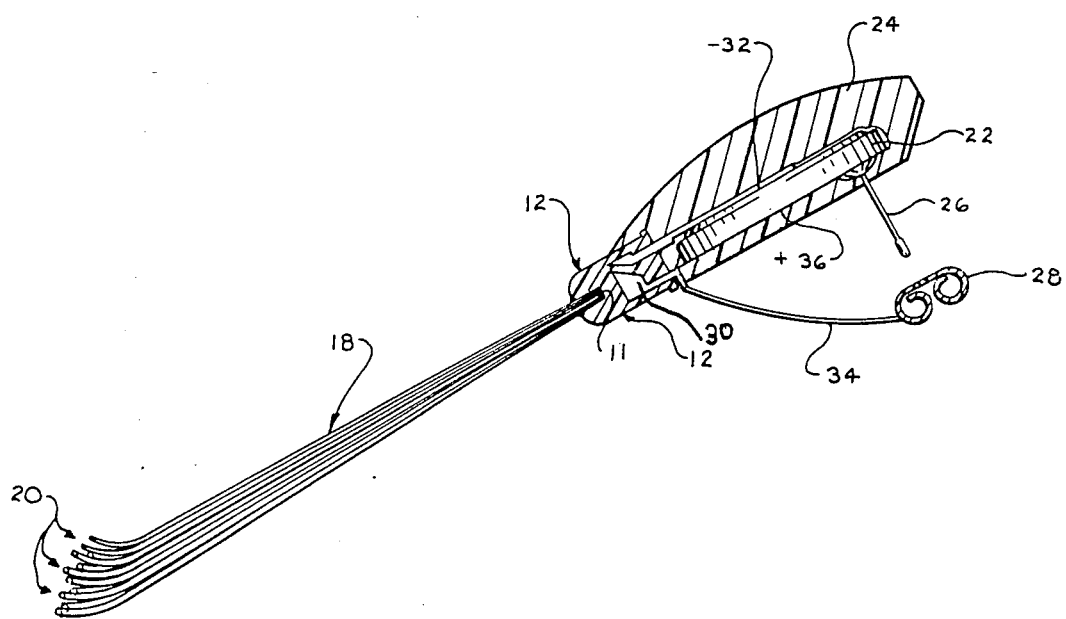

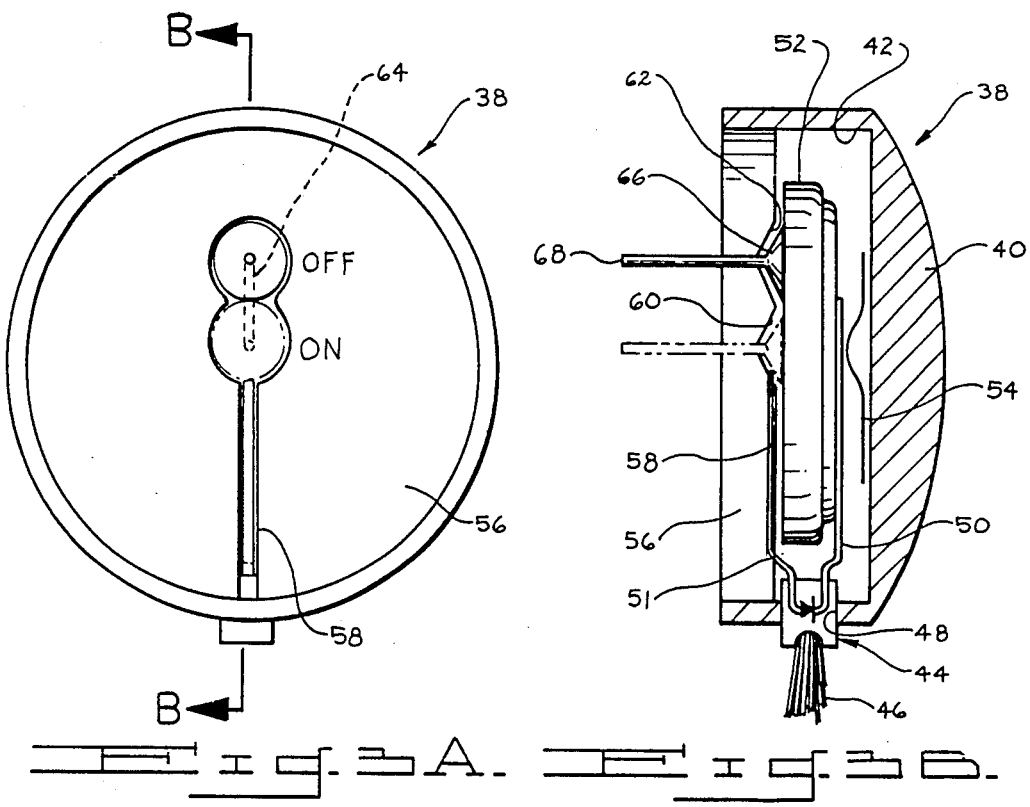

ELECTRONIC JEWELRY

BACKGROUND OF THE INVENTION

This invention relates generally to ornamental electronic jewelry. More particularly, this invention relates to ornamental electronic jewelry utilizing a bundle of fiber-optic strands which are directly connected to a light emitting diode where in turn, the light emitting diode and the self contained battery are encased in a nonconductive ornamental housing. In a preferred embodiment, the electronic jewelry comprises an earring.

Electronic jewelry is well known in the art and has recently become very popular. Most of this jewelry utilizes some means of illumination including a light bulb or a light emitting diode (LED). For example, illuminated jewelry having an LED attached to a hearing aid type battery and a clip or similar structure for attaching the jewelry to the wearer is disclosed in U.S Pat. No. 4,237,525. Other examples of illuminated jewelry incorporating an LED and a battery (typically a self contained hearing aid type battery) are disclosed in U.S. Pat. Nos. 3,866,035; 4,009,381; 4,076,976; 4,309,743; 4,337,504 and 4,459,645. Other less pertinent examples of illustated jewelry are found in U.S. Pat. Nos. 3,384,740; 3,790,775; 3,814,926; 4,215,388 and 4,271,457. Many of the foregoing less pertinent examples utilize a light bulb rather than an LED to provide the means for illumination.

While LED illuminated jewelry devices are advantageous from the standpoint of requiring little power expenditure, having an extremely small size and being quite light weight, there is a perceived need to provide illuminated electronic jewelry which is even more attractive and has a markedly distinct and novel appearance relative to the prior art LED type illuminated ornamental jewelry. Such highly stylized and distinctive electronic illuminated jewelry has been disclosed in U.S. Pat. No. 4,186,425. Iis patent describes a piece of jewelry which comprises an elongated length of fiber-optic material, prewound into a multilooped coil and cut at one radial point, each open end of the loop being clamped to a shell containing a source of illumination in such a manner that the cut ends of the various loops are exposed to the source of illumination whereupon the individual loops extending from the shell are cut at varying lengths to present a jewelry piece which clings to the wearer by reason of the prewound stresses of the loops. Because of the use of the fiber-optic strands, the jewelry disclosed in U.S. Pat. No. 4,186,425 will emit multiple dots of lights as the light is transmitted to the fiber-optic material to the unclamped ends thereof. As is well known, fiber-optic strands act as a conduit for light and will transport light from a light source through the strands to the ends thereof. It will thus be appreciated that the use of fiber-optic strands in jewelry present a limitless number of novel configurations and a multitude of attractive and distinctive jewelry configurations.

While suitable for its intended purposes, the illuminated jewelry described in U.S. Pat. No. 4,186,425 has a somewhat complicated structure including the use of a bulky housing, a plurality of separate wires, conventional light bulbs and tape. Thus, with the ever increasing popularity of illuminated electronic jewelry and the distinctive novelty of fiber-optic strands, there is a need for improved electronic illuminated jewelry utilizing fiber-optic strands with the jewelry being inexpensive to manufacture and purchase, light weight and compact and attractive.

SUMMARY OF THE INVENTION

The above discussed and other problems and deficiencies of the prior art are overcome or alleviated by the illuminated electronic jewelry of the present invention. In accordance with the present invention, an electronic LED has an opening formed therein and a bundle of fiber-optic strands are integrally attached within the opening of the LED. A battery is then connected to the LED such that light is emitted therefrom and travels directly from the LED through the fiber-optic strands to the end points thereof. Preferably, the LED and the battery are encased in an attractive housing and means are provided to the housing for attachment to an ear or for use as a broach, pendant, stickpin or the like.

In a preferred embodiment, the present invention takes the form of an earring wherein the means for attaching the earring to an ear also functions as an on/off switch for illuminating the LED and the fiber-optic strands. In yet another preferred embodiment of the present invention, an electronic circuit is provided within the non-conductive housing so that the LED and the fiber-optic strands sequentially flash.

The illuminated electronic jewelry of the present invention provides many features and advantages. For example, the present invention is inexpensive to manufacture and purchase and is extremely light weight and compact. Moreover, the jewelry is highly stylized and distinctive in appearance which adds to its overall attractive quality.

A very important structural feature of the present invention which provides the improved qualities and advantages thereof, is the direct connection between the bundle of fiber-optic strands and the LED. As mentioned, this direct connection is accomplished by providing an opening in the LED housing and stuffing the bundle of fibers directly therein. Thereafter, adhesive or other means may be added to ensure that the bundle of fiber-optic strands remain integrally attached thereto.

The above-discussed and other features and advantages of the present invention will be understood and appreciated by those skilled in the art from the following detailed description and drawings.

BRIEF DESCRIPTION OF THE DRAWINGS

FIG. 1 is a side-elevation view of the illuminated electronic jewelry in accordance with the present invention;

FIG. 2 is a side-elevation view, partly in cross-section, of the illuminated electronic jewelry of FIG. 1 in the form of an earring;

FIG. 3A is a plan view of an alternative embodiment of the illuminated electronic jewelry of FIG. 2;

FIG. 3B is a cross-sectional elevation view along the line B—B of FIG. 3A;

DESCRIPTION OF THE PREFERRED EMBODIMENT

Figure 4A:
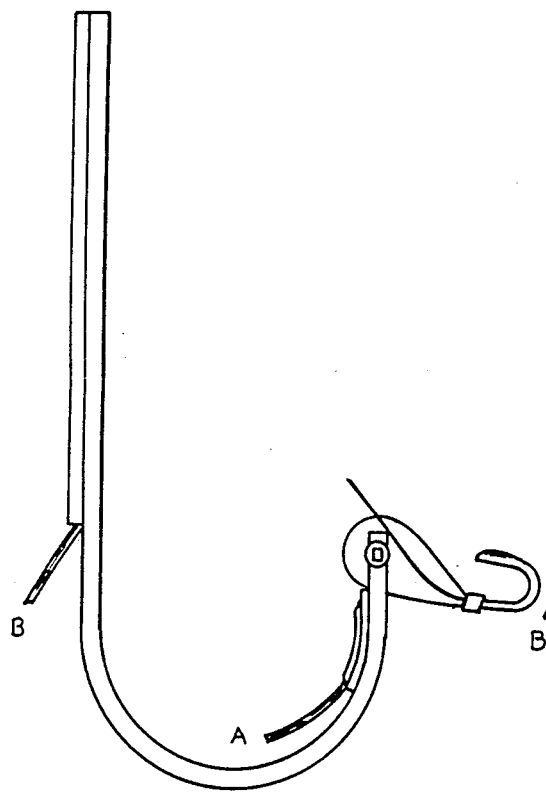
FIG. 4A is a side elevation view of an embodiment of the illuminated jewelry of FIG. 2 utilizing clip-on fasteners in an open position.

Referring first to FIG. 1, the electronic jewelry of the present invention, in its simplest form, is shown generally at 10. Jewelry 10 comprises a light emitting diode (LED) 12 of conventional and well known construction. LED 12 has a hole or opening 14 formed therethrough preferably at one and thereof. Opening 14 is drilled, molded or otherwise formed in the center of the LED casing 16 and is directed toward the diode light source (not shown) within casing 16. Next, a bundle of fiber-optic strands 18 are inserted into opening 14 as shown in FIG. 1. Preferably, a suitable adhesive (preferably a transparent polymeric adhesive such as epoxy), is used to bond the fiber-optic strands 18 to the LED 12 as well as to increase the efficiency of the transmission of light from the LED through the strands. The fiber-optic strands 18 terminate at a plurality of points shown generally at 20. In a preferred embodiment of the present invention, the strands are bent or formed so as to spread out the fibers and whereby change the direction of the light propagation to form a fanciful and attractive pattern. LED 12 is energized by use of a portable power source, preferably a battery depicted schematically at 22. Battery 22 is preferably of the type used in hearing aids and the like and comprises a small, compact disk (see FIG. 2).

The structure shown is FIG. 1 is a significant and important feature of the present invention. While the use of conventional LED and fiber-optic strands, in and of themselves, have been accomplished in prior art illuminated electronic jewelry, none of the prior art describes structure of FIG. 1 wherein a bundle of fiber-optic strands are provided in an opening formed through a conventional LED. This structure provides unexpected and important advantages to the present invention including efficient transfer of light from the LED through the fiber-optic strands. Thus, it will be appreciated that when battery 22 is energized, LED 12 will emit light which will be directly transferred from the fiber-optic strands within opening 14 of casing 16 whereby the light will then travel through strands 18 to end points 20.

Turning now to FIG. 2, the electronic jewelry of FIG. 1 is shown in a preferred embodiment as an earring. In FIG. 2, a nonconductive and preferably attractive housing 24 surrounds and encases battery 22 in a portion of LED 12. It will be appreciated that while housing 24 is shown as a semispherical disk, housing 24 can take on any design or shape as desired. Housing 24 includes a conventional means for attachment of the earring to an ear. In this case, the attachment means is especially adapted for pierced ears and comprises a pin 26 and a clasp 28. Pin or post 26 is connected to the backside or positive electrode 36 of battery 22. Clasp or clutch 28 is connected by a wire lead 34 or other means directly to the anode lead 30 of LED as shown in FIG. 2. The cathode lead of the LED is connected directly to the negative face of the battery 32. It will be appreciated that when the earring of FIG. 2 is attached to an ear and clutch 28 is connected to post 26 in a conventional manner, an electric circuit will be completed whereby LED 12 will emit light which will travel from a first end 11 of fibers 18 to the end points 20 of the fibers. In this way, a very attractive, distinctive and stylized illuminated earring will be provided. When the earring clutch is detached from its post, the LED is deactivated and the battery no longer discharges energy. As a consequence, no further light is emitted from end points 20.

Referring now to FIGS. 3A and 3B, an alternative version of illuminated jewelry in accordance with the present invention is shown generally at 38. Jewelry item 38 comprises an earring similar to FIG. 2 with the primary differences lying in the on/off switching mechanism. Earring 38 includes an attractive housing 40 having an opening or cavity 42 therein. An LED housing 44 having a bundle of fiber-optic strands 46 associated therewith as described above (FIG. 1) is positioned in an opening 48 in housing 40. Thus, LED 44 communicates between cavity 42 within housing 40 and the outside environment. LED leads 50 and 51 extend upwardly from LED 44 and straddle either side of battery 52. Battery 52 is placed into the cavity 42 face down with one of the LED leads 50 positioned between battery 52 and a springy bar 54. Springy bar 54 may be adhesively or otherwise attached to housing 40. Housing 40 includes a cover plate 56 which may snap or otherwise attach to the rear of the housing so as to enclose battery 52 within cavity 42. Cover plate 56 includes a groove 58 which receives the second LED lead 51 therein. It will be appreciated that cover plate 56 includes a pair of adjacent shallow indents or cups 60 and 62 and that lead 51 is positioned in groove 58 and terminates at the beginning of the first indent 60. Significantly, LED lead 51 and groove 58 is spaced from and will not be in contact with battery 52.

As mentioned, back cover plate 56 includes a pair of indents 60 and 62 as well as a slot 64 running between the respective centers of indents 60 and 62. Cup shaped indents 60 and 62 are sized to receive a similarly shaped earring post base 66. It will be appreciated that earring post base 66 has an earring post 68 attached thereto and that earring post 68 may freely move within slot 64 so that base 66 may move between a first position at indent 62 and a second position at indent 60.

During use, spring bar 54 will urge battery 52 towards cover plate 56 and thereby against earring post base 66. Thus, when earring post base 66 is in indent 62 (shown as "off" in FIG. 3A) base 66 will be spaced from LED lead 51 and no electrical circuit will be made. Conversely, when base 66 is moved into indent 60 in the position indicated as on, base 66 will provide an electrical bridge between battery 52 and LED lead 51 thereby completing an electrical circuit and activating the LED and associated fiber-optic strands. It is believed that this switching mechanism provides a cost effective and easily manipulated means of activating or deactivating the illuminated jewelry of the present invention.

Figure 4B:
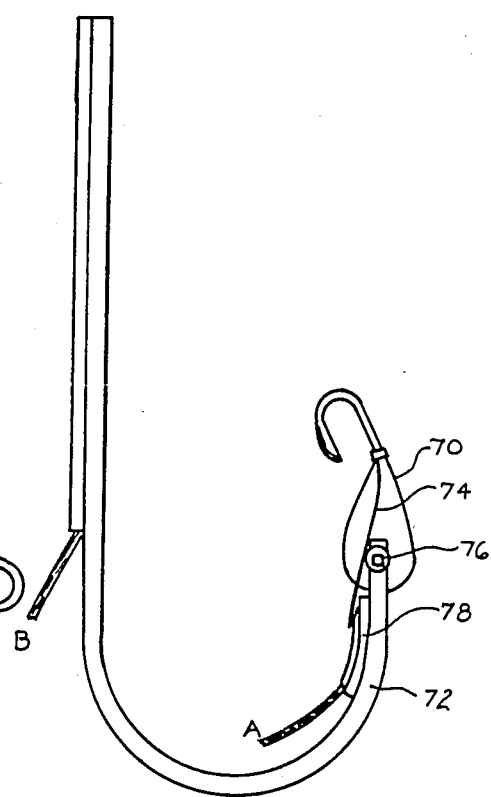
FIG. 4B is a side elevation view ofthe earring of FIG. 4A in a closed position.

In FIGS. 4A and 4B, yet another embodiment of the present invention is shown in conjunction with an earring. However, unlike the embodiments of FIGS. 2 and 3, the embodiment of FIG. 4 utilizes clip type ear attachment rather than an attachment for pierced ears. The clip on fastener of FIGS. 4A and 4B is associated with an illuminated earring which is quite similar to the earrings discussed hereinabove except for a novel on/off mechanism which will now be discussed. The clip on fastener comprises a two-piece hinge 70 and 72 (element 72 comprising the earring support body). The hinge has a small springy bar 74 attached thereto. Springy bar 74 presses against a pivot point 76 on the base of the hinge fastener to create a snapping effect. Hinge member 70 is a conventional non-pierced ear attaching lever. The electrical circuitry (i.e., battery, LED and associated wiring and other components) is attached to the earring support at leads A and B. An electrically insulating material 78 separates lead A from the rest of the earring support. When the clip is opened or closed about the hinge, the springy bar 74 makes or breaks electric contact with lead A. When electric contact is made, a circuit is complete between the electrical circuitry at leads A and B, through the earring support.

Figure 5:
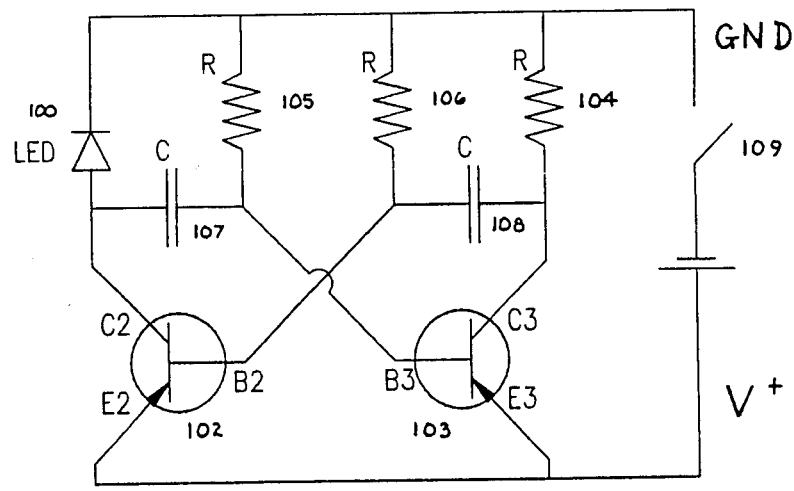
FIG. 5 is an electronic schematic of a circuit which may be used in conjunction with the electronic jewelry of the present invention for providing sequential flashing.

It is often desirable to provide electronic jewelry which pulses or flashes in a sequential fashion. Such flashing can easily be used in illuminated jewelry of the present invention, particularly in conjunction with one of the earrings described hereinabove. Referring now to FIG. 5, the electrical schematic for such electronic circuitry is shown. It will be appreciated that the circuitry of FIG. 5 may be used with any of the earrings or other jewelry which has been described in conjunction with the present invention.

The electric circuitry shown in FIG. 5 comprises an oscillator circuit which functions to flash a light emitting diode 100 on and off at a given oscillator rate and duty cycle. The oscillator circuit comprises two transistors 102 and 103, each having a collector, emitter, and base (labeled C, E, and B). The emitters of transistors 102, 103 are connected to the positive terminal of the power source (V+). The collector of transistor 102 is connected to ground (GND) through the light emitting diode 100 while the collector of transistor 103 is connected to point ground (GND) through a resistor 104. Base bias is provided by resistors 105 and 106 connected between ground (GND) and the bases of transistor 103 and 102, respectively. Feedback between the transistors is provided by capacitor 107 connected between collector C2 and base B3, and a capacitor 108 between collector C3 and B2. Capacitors 107 and 108 determine the pulse repetition rate of the oscillator.

The negative terminal of the power supply is in contact with the ground lead (GND) and the positive terminal of the power supply is connected to the point +V through a switching mechanism labeled 109. Switching mechanism may be the pierced ear or clip-on type. When the jewelry (earring) is physically attached to the body, a firm electric connection is simultaneously made.

The light emitting diode 100 provides an efficient and concentrated light source so as to produce an attractive and decorative effect when pulsed on and off at a relatively slow repetition rate, preferably around 5 to 10 cycles per second. The electronics circuit is physically small and inexpensive. Commercially available integrated chips may be utilized to provide the required pulse rate and duty cycle characteristics. The circuit is in essence a multibrator which uses a light-emitting diode as the collector load for one of the two transistors and the duty cycle is readily selectable by variation of the electrical value of one or more of the components. It was found that a repetition rate of approximately 5 cycles per second with the light emitting diode illuminated approximately 20% of the time provided a pleasing effect while at the same time consumed a minimum amount of power, permitting operation for many hours by a single lithium 3 volt battery.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Electronic jewelry comprising:
    a housing;
    a battery in said housing, said battery having first and second terminals;
    light emitting diode (LED) means associated with said housing, said LED means comprising a diode encased in a block of insulative material, said block of insulative material having an opening partially therethrough, said LED means also having first and second leads;
    a plurality of fiber-optic strands defining a bundle of strands, said bundle having a first end and a second end, said first end being disposed and retained within said opening in said block of insulative material of said LED means; and
    means for selectively connecting and disconnecting said battery from said LED means.

2. The jewelry of claim 1 wherein:
    a portion of said LED means extends outwardly of said housing.

3. The jewelry of claim 1 wherein said connecting and disconnecting means comprises:
    a conductive post in contact with said first terminal of said battery and extending outwardly of said housing;
    a wire attached at a first end to said second lead of said LED means;
    a conductive clasp attached to a second end of said wire; and
    wherein said clasp is adapted for detachable connection to said post and wherein a electric circuit is completed between said battery and said LED means when said clasp is connected to said post.

4. The jewelry of claim 1 wherein said connecting and disconnecting means comprises:
    said first LED means lead in contact with said first battery terminal;
    said second LED means lead being disposed across and spaced from said second battery terminal; and
    a conductive post in said housing, a portion of which extends outwardly of said housing, said post being selectively movable between a first position spaced from said second LED means lead and a second position in contact with both said second LED means lead and said second battery terminal;
    wherein an electric circuit is completed between said battery and said LED means when said post is in said second position.

5. The jewelry of claim 4 including:
    spring means in said housing urging said battery against said post.

6. The jewelry of claim 4 wherein said housing includes a front side and a back side, said post extending from said back side and including:
    a pair of seating areas for receiving said post in said respective first and second positions;
    a groove through said back side communicating between said pair of seating areas.

7. The jewelry of claim 6 wherein:
    said back side of said housing defines a removable cover.

8. The jewelry of claim 1 wherein said connecting and disconnecting means comprises:

a first conductive hinge portion hingedly connected to a second conductive hinge portion, said housing being attached to said first hinge portion;

means electrically connecting said first hinge portion to said first hinge portion to said first battery terminal;

electrically insulating material on a portion of said first hinge portion;

electrical contact means on said insulating material and electrically isolated from said first hinge means, said electrical contact means being electrically connected to said second battery terminal; and a conductive member attached to said second hinge portion wherein said conductive member is selectively movable into and out of contact with said electrical contact means;

and wherein an electric circuit is completed between said battery and said LED means when said conductive member is in contact with said electrical contact means.

9. The jewelry of claim 8 wherein:

said conductive member is a springy bar.

10. The jewelry of claim 1 including:

electrical circuit means in said housing for sequentially connecting and disconnecting said battery from said LED means whereby said bundle of fiber optic strand flashes.

* * * * *